Figure 1:
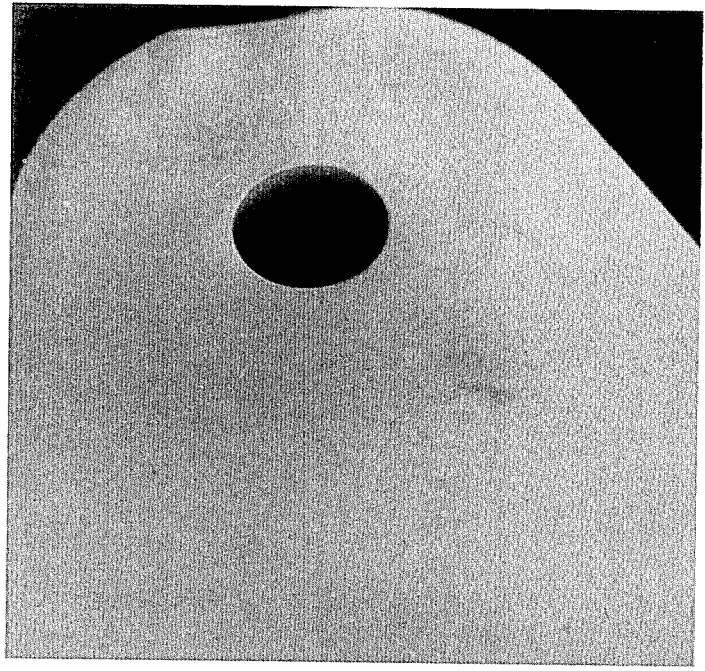

United States Patent [19]
Wolters et al.

[11] 3,969,292
[45] July 13, 1976

[54] STABILIZED MOLDING COMPOSITIONS BASED ON POLY(OXYMETHYLENE)

[75] Inventors: Ernst Wolters; Heinz Schmidt, both of Frankfurt am Main; Karlheinz Burg, Langenhain, Taunus; Günter Sextro, Naurod, Taunus, all of Germany

[73] Assignee: Hoechst Aktiengesellschaft, Frankfurt am Main, Germany

[22] Filed: May 30, 1975

[21] Appl. No.: 582,301

Related U.S. Application Data

[63] Continuation of Ser. No. 432,405, Jan. 10, 1974, abandoned.

[30] Foreign Application Priority Data

Jan. 12, 1973    Germany.......................... 2301351

[52] U.S. Cl. .................. 260/18 EP; 260/45.7 R; 260/45.85 R; 260/45.85 B; 260/45.85 T
[51] Int. Cl.² ............................................. C08J 3/20
[58] Field of Search ................ 260/45.9 P, 45.85 B, 260/45.7 R, 18, 45.85 R, 45.85 T

[56] References Cited
UNITED STATES PATENTS

| | | | |
|---|---|---|---|
| 3,313,767 | 4/1967 | Berardinelli et al. | 260/45.95 |
| 3,340,219 | 9/1967 | Stemmler | 260/18 |
| 3,424,819 | 1/1969 | Green | 260/45.95 |
| 3,553,117 | 1/1971 | Gutweiler et al. | 260/45.95 |

*Primary Examiner*—V.P. Hoke
*Attorney, Agent, or Firm*—Curtis, Morris & Safford

[57] ABSTRACT

Oxymethylene polymers are stabilized against the action of heat and oxygen by a stabilizer combination of an ester of a hydroxyl group containing araliphatic or aromatic carboxylic acid and an alkaline earth metal salt of an aliphatic, araliphatic or aromatic carboxylic acid. The efficiency of the stabilizer combination can be further improved by the addition of a costabilizer, especially a guanidine compound. The stabilized poly(oxymethylenes) are suitable for the manufacture of semifinished and finished articles.

9 Claims, 4 Drawing Figures

STABILIZED MOLDING COMPOSITIONS BASED ON POLY(OXYMETHYLENE)

This is a continuation of application Ser. No. 432,405, filed Jan. 10, 1974, now abandoned.

The present invention relates to a stabilized molding composition based on poly(oxymethylene).

It is known that poly(oxymethylenes), i.e. homo- or copolymers of formaldehyde or of cyclic oligomers of formaldehyde, for example trioxane can be stabilized against the action of heat and oxygen by addition of stabilizers.

It is also known to stabilize molding compositions based on poly(oxymethylenes) by adding a stabilizer system comprising 1. from 0.05 to 4 % by weight, calculated on the poly(oxymethylene), of compounds of the formula

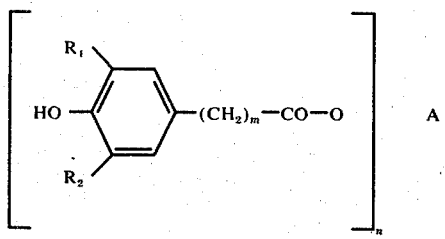

in which $R_1$ represents an alkyl radical having from 1 to 6 carbon atoms, $R_2$ is a hydrogen atom or an alkyl radical having from 1 to 6 carbon atoms, A stands for a bi- to hexavalent aliphatic hydrocarbon radical having from 1 to 12 carbon atoms, $m$ is zero or an integer of from 1 to 6 and $n$ corresponds to the valence of A, and from 2. 0.01 to 3 % by weight, calculated on the poly(oxymethylene), of alkaline earth metal salts of carboxylic acids having from 10 to 20 carbon atoms, and/or alkaline earth metal hydroxides (cf. U.S. Pat. No. 3,743,614).

The present invention provides a stabilized molding composition based on poly(oxymethylene) having a content of a. 0.05 to 4 %, preferably 0.1 to 2 % by weight, calculated on the poly(oxymethylene), of a compound of the formula

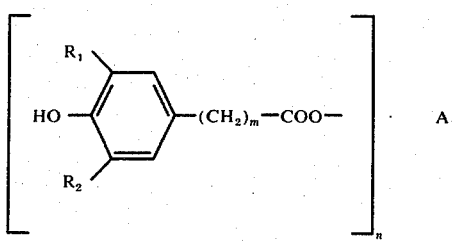

in which $R_1$ represents an alkyl radical having from 1 to 6, preferably from 1 to 4 carbon atoms, $R_2$ is a hydrogen atom or an alkyl radical having from 1 to 6, preferably from 1 to 4 carbon atoms, A stands for a bi- to hexavalent, preferably bi- to tetravalent, linear or branched aliphatic hydrocarbon radical having from 1 to 12, preferably from 1 to 6 carbon atoms, $m$ is zero or an integer of from 1 to 6, preferably zero or 1 or 2, and $n$ corresponds to the valence of A, and b. 0.01 to 3 %, preferably 0.1 to 2 % by weight, calculated on the poly(oxymethylene), of an alkaline earth metal salt of an aliphatic mono-, di-, or tri-carboxylic acid having from 2 to 9, preferably from 3 to 7 carbon atoms, or of an araliphatic or aromatic carboxylic acid having from 7 to 9 carbon atoms, and optionally c. 0.01 to 1 % by weight, calculated on the poly(oxymethylene), of a compound of the formula

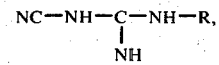

in which R is a hydrogen atom, a cyano group, an alkyl radical having from 1 to 12, preferably from 1 to 6 carbon atoms, a cycloalkyl radical having from 6 to 12, preferably from 6 to 8 carbon atoms, or an aryl radical having from 6 to 12, preferably from 6 to 8 carbon atoms, the said alkyl, cycloalkyl or aryl radical being possibly substituted each by 1, 2 or 3 hydroxyl groups.

The stabilizer combination used according to the invention cannot be dissolved out by the usual solvents, nor diffuse out of the poly(oxymethylene) under thermal load, so that the molding compositions of the invention are especially suitable for use at elevated temperature or in contact with solvents. The stabilizers used are colorless and do not or only insignificantly discolor the poly(oxymethylenes) even under the prolonged influence of heat, light or alkaline media.

The special advantage of the molding composition of the invention resides in the fact that it can be better processed by injection molding into shaped articles without surface waviness or streaks than known molding compositions. The injection molded articles of the composition of the invention have an entirely smooth and glossy surface. Owing to the smooth surface without streaks the mechanical strength and the friction coefficient are somewhat improved. This may be of advantage with technical parts subject to high stress or in the case of bearings which do not require servicing.

Esters of araliphatic or aromatic carboxylic acids substituted in the nucleus, suitable for use as component a) of the stabilizer combination are especially esters of araliphatic or aromatic monocarboxylic acids having from 7 to 13, preferably from 7 to 9 carbon atoms, the aromatic nucleus of which is substituted in 4-position by a hydroxyl group and in 3- or 3- and 5-position, by an aliphatic alkyl radical having from 1 to 4 carbon atoms, and of straight-chain or branched di- to tetrahydric alcohols, for example esters of ω-(3-tert.-butyl-4-hydroxy-phenyl)-pentanoic acid, of β-(3-methyl-5-tert.-butyl-4-hydroxyphenyl)-propionic acid, of 3,5-di-tert.-butyl-4-hydroxy-benzoic acid, of (3,5-di-tert.-butyl-4-hydroxy-phenyl)-acetic acid, of β-(3,5-di-tert.-butyl-4-hydroxyphenyl)-propionic acid, or of (3,5-di-isopropyl-4-hydroxyphenyl)-acetic acid, with ethylene glycol, propanediol-(1,2), propanediol-(1,3), butanediol-(1,4), hexanediol-(1,6), decanediol-(1,10), 1,1,1-trimethylol-ethane, or pentaerythritol.

Suitable alkaline earth metal salts are preferably the magnesium, calcium, strontium and barium salts of 1. saturated or unsaturated, aliphatic mono-, di-, or tricarboxylic acids having from 2 to 9, preferably from 3 to 7 carbon atoms, for example of acetic acid, propionic acid, butyric acid, valeric acid, caproic acid, heptoic acid, caprylic acid, and pelargonic acid; oxalic acid, malonic acid, succinic acid, glutaric acid, adipic acid and suberic acid; acrylic acid, methacrylic acid, crotonic acid, isocrotonic acid, angelic acid and tiglic acid, or of 2. araliphatic carboxylic acids having from 7 to 9 carbon atoms, for example phenylacetic acid and cinnamic acid, or of 3. aromatic carboxylic acids having from 7 to 9 carbon atoms, for example benzoic acid.

Especially suitable are alkaline earth metal salts of mono-, di-, or tri-basic hydroxycarboxylic acids having from 2 to 9, preferably from 3 to 7 carbon atoms, for example the calcium and magnesium salts of lactic acid, mandelic acid, malic acid, citric acid, hydroxypivalic acid, or salicylic acid.

The molding composition of the invention preferably contains a costabilizer against the action of heat and oxygen; suitable are, for example, polyamides, amides of polybasic carboxylic acid, such as malonic diamide, ureas and poly(N-vinyllactams). Especially suitable costabilizers are guanidine compounds of the formula

in which R is a hydrogen atom, a cyano group, an alkyl radical having from 1 to 12, preferably from 1 to 6 carbon atoms, a cycloalkyl radical having from 6 to 12, preferably from 6 to 8 carbon atoms, or an aryl radical having from 6 to 12, preferably from 6 to 8 carbon atoms, the said alkyl, cycloalkyl or aryl radical being possibly substituted each with 1, 2, or 3 hydroxyl groups, for example cyanoguanidine, N-cyano-N'-methylguanidine, N-cyano-N'-ethylguanidine, N-cyano-N'-isopropylguanidine, N-cyano-N'-tert.-butylguanidine, N-cyano-N'-dodecylguanidine, N-cyano-N'-cyclohexylguanidine, N-cyano-N'-benzylguanidine, N-cyano-N'-phenylguanidine, N-cyano-N'-hydroxymethylguanidine, N-cyano-N'-(2-hydroxyethyl)guanidine, or N,N'-dicyanoguanidine. The costabilizer is added, if any, in an amount of from 0.01 to 1 %, preferably 0.1 to 0.5 % by weight, calculated on the poly(oxymethylene).

The moulding composition according to the present invention may contain further stabilizers, for example known light stabilizers, such as derivatives of benzophenone, acetophenone or triazine. Other known additives, such as dyestuffs, pigments reinforcing agents, or fillers may also be added.

The stabilizers may be incorporated into the poly(oxylmethylene) in the form of a powder by means of commercial mixers, for example dry mixers, or they may be dissolved in a suitable solvent, for example methanol, acetone or methylene chloride, and applied to the polymer, while stirring. Subsequently, the solvent is evaporated.

Poly(oxymethylenes) which may be stabilized in accordance with the present invention, are homopolymers of formaldehyde or of cyclic oligomers of formaldehyde, for example, trioxan, the terminal hydroxyl groups of which are blocked by esterification or etherification, and copolymers of formaldehyde or of cyclic oligomers of formaldehyde, preferably trioxan, which contain oxyalkylene groups with at least two, preferably from two to four adjacent carbon atoms in the main valence chain. The proportion of comonomers in the copolymers is of from 0.1 to 50 % by weight, preferably from 0.1 to 15 % by weight.

As compounds which are suitable for cationic copolymerization with formaldehyde or cyclic oligomers of formaldehyde, preferably trioxan, there may especially be used cyclic ethers and/or cyclic acetals and/or linear polyacetals. Especially suitable are cyclic ethers having from 3 to 5 ring members, preferably epoxides, furthermore cyclic acetals having from 5 to 11, preferably from 5 to 8 ring members, and, more especially cyclic formals of α,ω-diols having from 2 to 8, preferably from 2 to 4 carbon atoms in the chain, the carbon chain of which may be interrupted by an oxygen atom at intervals of 2 carbon atoms, as well as linear polyformals.

Especially suitable are compounds of the formula

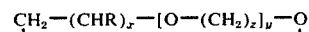

in which R represents a hydrogen atom, an alkyl radical having from 1 to 6, preferably from 1 to 3 carbon atoms, which may be substituted by 1 to 3 halogen atoms, preferably chlorine atoms, an alkoxymethyl radical having from 2 to 6, preferably from 2 to 4 carbon atoms, a phenyl radical, or a phenoxymethyl radical; $x$ stands for an integer of from 1 to 3, $y$ being zero in this case, or $y$ is an integer of from 1 to 3, $x$ being zero and $z$ being 2; or $z$ represents an integer of from 3 to 6, preferably 3 or 4, $x$ being zero and $y$ being 1 in this case.

As cyclic ethers, for example ethylene oxide and epichlorhydrin may be used, as well as propylene oxide, styrene oxide, cyclohexene oxide, oxacyclobutane, phenylglycidyl ether and butanediol-diglycidyl ether, while as cyclic formals for example 1,3-dioxolane, 1,3-dioxepane and 1,3,6-trioxocane as well as 4-chloromethyl-1,3-dioxolane, 1,3-dioxonane and 1,3-dioxacycloheptene-(5) are used.

The poly(oxymethylenes) used in accordance with the present invention are macromolecular substances; their reduced specific viscosity (RSV-value, η red), measured at 140°C with a solution of 0.5 % by weight of the polymer in γ-butyrolactone containing 2 % by weight of diphenylamine as stabilizer, is within the range of from about 0.3 to 3.0, preferably from 0.5 to 2 deciliters per gram (dl/g). The crystallite melting points of the poly(oxymethylenes) are in the range of from 150° to 180°C.

The moulding composition in accordance with the present invention can be processed by all processes commonly used for thermoplastic materials, for example injection moulding, extrusion, blow molding, melt spinning, or deep drawing; it is suitable for the manufacture of semi-finished and finished articles, such as shaped articles, for example ribbons, rods, bristles, threads, fibers, plates, films, sheets, tubes or hoses, as well as houseware, for example, bowls or cups, and machine parts, for example, casings or gear wheels. The composition of the invention is particularly suitable for producing injection molded articles provided with recesses, ribs or perforations which impede the flow of the molten mass in the mold.

The following examples illustrate the invention, the parts and percentages being by weight unless otherwise stated.

EXAMPLES 1 to 12 AND COMPARATIVE EXAMPLES A TO C

An acetylized formaldehyde homopolymer (RSV: 0.90 dl/g) was intimately mixed with 1.0 % of tetrakis-[β-(3,5-di-tertbutyl-4-hydroxyphenyl)-propionyl-oxymethyl]-methane and 0.2 % of a magnesium salt of the acids listed in Table 1, and the mixture was granulated on a commercial extruder. With the dried granules the loss in weight was determined after heating a sample for 45 and 120 minutes, respectively, in air at 230°C. Prior to and after heating the granules to 230°C for 30 minutes in a closed mold, 2.5 mm thick plates having a diameter of 4.5 cm were molded. The yellowing of the plates was measured in a differential colorimeter (colormaster of Manufacturing, Engineering and Equipment Corp. Hatboro, Pa., USA) (yellow value).

Figure 2:
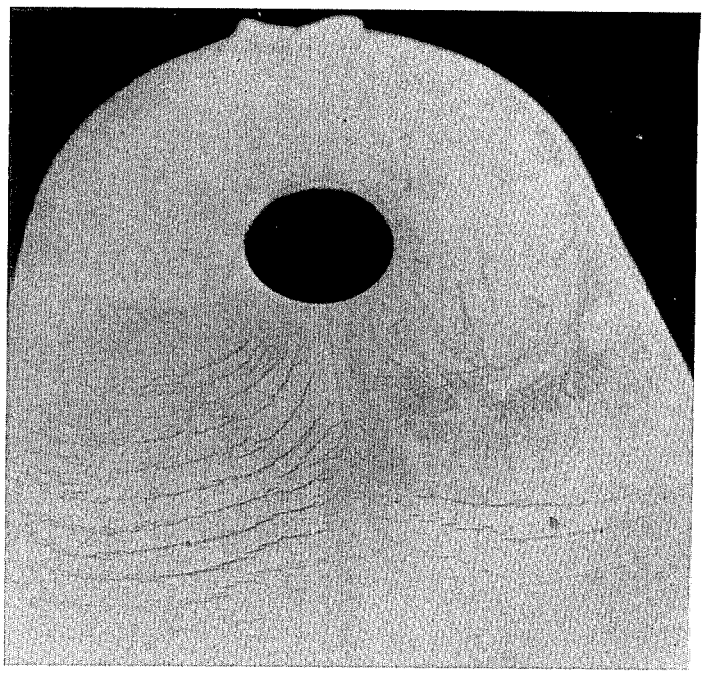

On a commercial injection molding machine drop-shaped plates were moulded with the granules (mass temperature: 200°C, temperature of the mold: 80°C, injection pressure and molding pressure 45 bars, advance of piston: medium). Plates of this type are especially suitable to detect a possible formation of streaks. A molded plate made with a poly(oxymethylene) molding composition stabilized with a mixture of 1.0 % by weight of tetrakis [β-(3,5-di-tert.butyl-4-hydroxyphenyl)-propionyl-oxymethyl]-methane and 0.2 % by weight of the magnesium salt of malic acid is free from streaks as can be seen on the accompanying FIG. 1, whereas a plate made of the same molding composition stabilized with a mixture of 1.0 % by weight of tetrakis [β-(3,5-di-tert.butyl-4-hydroxyphenyl)-propionyl-oxymethyl]-methane and 0.2% by weight of calcium stearate showed distinct streaks as can be seen on accompanying FIG. 2.

The results of the tests are listed in Table 1.

pionyloxy]-hexane and 0.1 % of an alkaline earth metal salt and the mixture was granulated on a commercial extruder. The loss in weight of the dried granules was determined by heating a sample for 120 minutes to 230°C in air. The yellow values were measured prior to and after heating for 30 minutes under the conditions of Examples 1 to 12.

Figure 3:
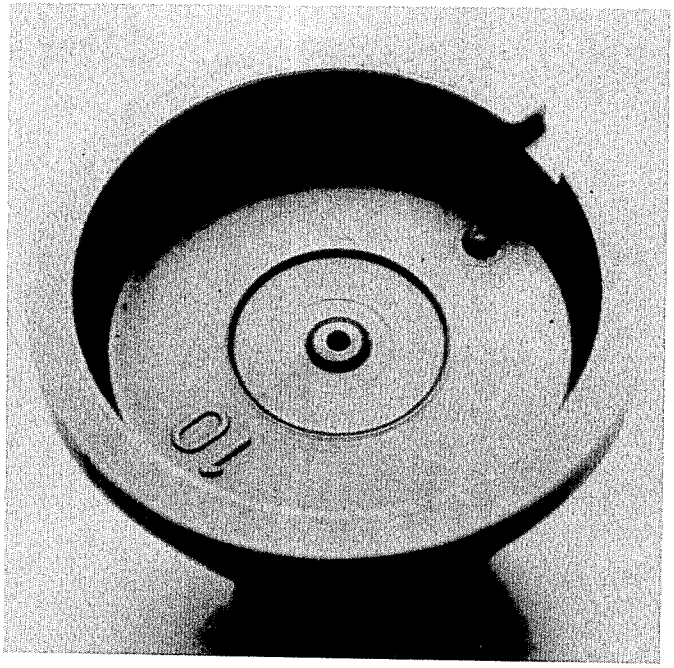
Figure 4:
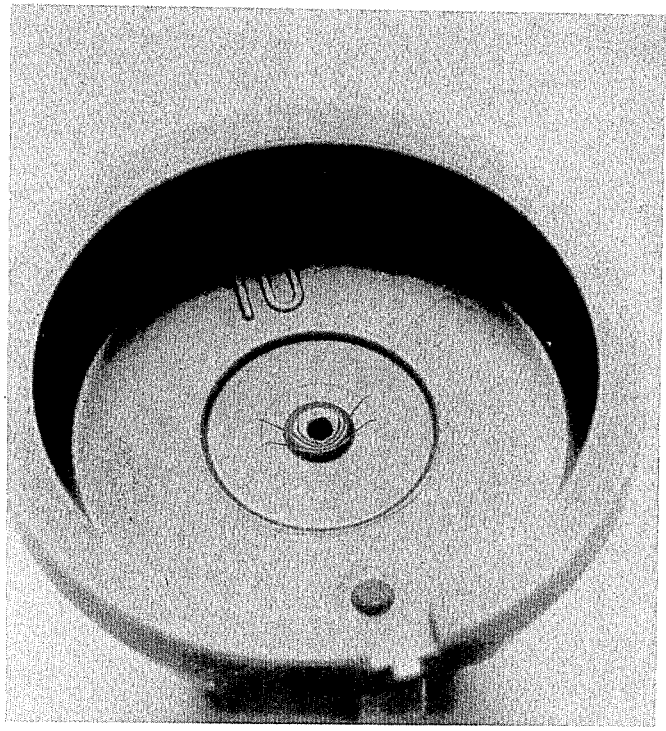

Under the conditions specified in Examples 1 to 12, valve disks were injection molded with the granules and the surface quality was examined. The valve disks made from the molding composition in accordance with the invention had a smooth unobjectionable surface (cf. FIG. 3) whereas the valve disks according to comparative Example D showed fine cracks in the viscinity of the orifice, which rendered them unsuitable for use (cf. FIG. 4).

TABLE 2

| Ex. | alkaline earth metal salt | loss in weight % | yellow value prior to heating | after heating |
|---|---|---|---|---|
| D | calcium ricinoleate | 2.8 | 1.1 | 17.1 |
| 13 | calcium lactate | 2.6 | 0.8 | 15.8 |

EXAMPLE 14

A copolymer of 98 % of trioxan and 2 % of ethylene oxide (RSV: 0.82 dl/g) was intimately mixed with 0.5 % of 1,6-bis-[β-(3,5-di-tert.butyl-4-hydroxyphenyl)-propionyloxy]-hexane, 0.1 % of calcium lactate and 0.02 % of cyanoguanidine and the mixture was granulated on a commercial extruder. The loss in weight of the dried granules was determined by heating a sample for 120 minutes at 230°C in air. It was 2.2 %. The yellow values prior to and after heating for 30 minutes under the conditions of Examples 1 to 12 were 0.6 and 12.4, respectively. Molded plates made with the granules had a smooth surface without streaks.

What is claimed is:

TABLE 1

| Ex. no. | magnesium salt of | loss in weight after 45 min. % | 120 min. % | yellow value prior to heating | after | surface quality of molded plate |
|---|---|---|---|---|---|---|
| A | stearic acid | 0.82 | 3.3 | 0.8 | 12.2 | pronounced streaks |
| B | vicinolic acid | 0.66 | 2.5 | 1.6 | 14.0 | pronounced streaks |
| C | arachic acid | 0.77 | 2.9 | 3.5 | 23.0 | pronounced streaks |
| 1 | acetic acid | 0.80 | 3.1 | 0.4 | 18.9 | no streaks |
| 2 | propionic acid | 0.61 | 2.8 | 1.8 | 17.4 | no streaks |
| 3 | caproic acid | 0.92 | 3.5 | 0.4 | 13.8 | no streaks |
| 4 | pelargonic acid | 0.84 | 3.1 | 0.1 | 12.2 | no streaks |
| 5 | lactic acid | 0.75 | 2.9 | 0.7 | 14.9 | no streaks |
| 6 | malic acid | 1.05 | 3.7 | 1.2 | 18.3 | no streaks |
| 7 | hydroxypivalic acid | 1.22 | 4.1 | 1.4 | 25.0 | no streaks |
| 8 | malonic acid | 1.17 | 4.3 | 0.1 | 10.0 | no streaks |
| 9 | adipic acid | 0.97 | 3.5 | 0.1 | 11.4 | no streaks |
| 10 | salicylic acid | 1.01 | 3.9 | 0.4 | 25.0 | no streaks |
| 11 | cinnamic acid | 1.05 | 4.0 | 1.8 | 17.1 | no streaks |
| 12 | mandelic acid | 0.91 | 3.4 | 0.0 | 15.2 | no streaks |

EXAMPLE 13 AND COMPARATIVE EXAMPLES D

A copolymer of 98 % of trioxan and 2 % of ethylene oxide (RSV: 0.82 dl/g) was intimately mixed with 0.5 % of 1,6-bis-[β-(3,5-di-tert.butyl-4-hydroxyphenyl)-pro- 1. A stabilized molding composition based on poly(oxymethylene) containing
   a. from 0.05 to 4 per cent by weight, calculated on the poly(oxymethylene), of a compound of the formula

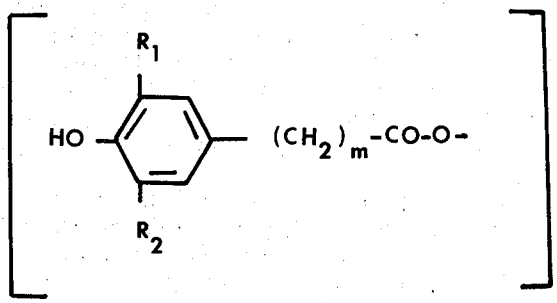

in which $R_1$ represents an alkyl radical having from 1 to 6 carbon atoms, $R_2$ stands for a hydrogen atoms or an alkyl radical having from 1 to 6 carbon atoms, A is a bi- to hexavalent aliphatic hydrocarbon radical having from 1 to 12 carbon atoms, m is zero or an integer of from 1 to 6 and n corresponds to the valence of A, b. from 0.01 to 3 per cent by weight, based on the weight of poly(oxymethylene), of an alkaline earth metal salt of an aliphatic hydroxycarboxylic acid having from 2 to 9 carbon atoms, and c. 0.01 to 1 per cent by weight, calculated on the poly(oxymethylene), of a compound of the formula

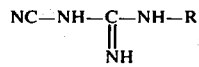

in which R represents a hydrogen atom, a cyano group, an alkyl radical having from 1 to 12 carbon atoms, a cycloalkyl radical having from 6 to 12 carbon atoms, or an aryl radical having from 6 to 12 carbon atoms, and in which the alkyl, cycloalkyl or aryl radical may be substituted by 1 to 3 hydroxyl groups.

2. The molding composition as claimed in claim 1 containing as poly(oxymethylene) a copolymer made from trioxane and a cyclic ether and/or a cyclic acetal and/or a linear polyacetal.

3. The molding composition as claimed in claim 1 containing as poly(oxymethylene) a copolymer made from trioxane and a three-membered cyclic ether.

4. The molding composition as claimed in claim 1 containing as component (a) an ester of hexanediol-(1,6), trimethylolethane, or pentaerythritol with β-(3,5-di-tert.-butyl-4-hydroxyphenyl)-propionic acid.

5. The molding composition as claimed in claim 1 containing as component (b) a calcium salt of a saturated or unsaturated carboxylic acid.

6. The molding composition as claimed in claim 5 containing as component (b) calcium lactate or magnesium lactate.

7. The molding composition as claimed in claim 1 containing cyanoguanidine as component (c).

8. A process for making a shaped article without surface waviness composed largely of poly(oxymethylene) which comprises incorporating in poly(oxymethylene) a stabilizer mixture comprising a. from 0.05 to 4 per cent by weight, calculated on the weight of poly(oxymethylene), of a compound of the formula

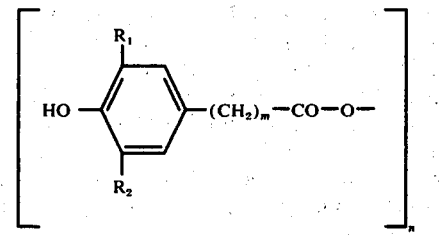

in which $R_1$ represents an alkyl radical having from 1 to 6 carbon atoms, $R_2$ stands for a hydrogen atom or an alkyl radical having from 1 to 6 carbon atoms, A is a bi- to hexavalent aliphatic hydrocarbon radical having from 1 to 12 carbon atoms, m is zero or an integer of from 1 to 6 and n corresponds to the valence of A, b. from 0.01 to 3 per cent by weight, based on the weight of poly(oxymethylene), of an alkaline earth metal salt of an aliphatic hydroxycarboxylic acid having from 2 to 9 carbon atoms, and c. 0.01 to 1 per cent by weight, calculated on the poly(oxymethylene) of a compound of the formula

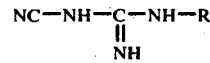

in which R represents a hydrogen atom, a cyano group, an alkyl radical having from 1 to 12 carbon atoms, a cycloalkyl radical having from 6 to 12 carbon atoms, or an aryl radical having from 6 to 12 carbon atoms, and in which the alkyl, cycloalkyl or aryl radical may be substituted by 1 to 3 hydroxyl groups, and molding said shaped article from the resulting stabilized poly(oxymethylene).

9. A shaped article molded from the composition of claim 1.

* * * * *